United States Patent [19]

Kamei et al.

[11] Patent Number: 5,435,955
[45] Date of Patent: Jul. 25, 1995

[54] PROCESS OF PRODUCING POROUS POLYPROPYLENE HOLLOW FIBER AND FILM

[75] Inventors: Eiichi Kamei; Yasushi Shimomura, both of Hirakata, Japan

[73] Assignee: Ube Industries, Ltd., Yamaguchi, Japan

[21] Appl. No.: 181,372

[22] Filed: Jan. 13, 1994

Related U.S. Application Data

[63] Continuation of Ser. No. 67,419, May 24, 1993, abandoned, which is a continuation of Ser. No. 893,606, Jun. 3, 1992, abandoned, which is a continuation of Ser. No. 711,512, Jun. 3, 1991, abandoned, which is a continuation of Ser. No. 433,463, Nov. 8, 1989, abandoned, which is a continuation of Ser. No. 207,026, Jun. 13, 1988, abandoned, which is a continuation of Ser. No. 811,519, Dec. 20, 1985, abandoned.

[30] Foreign Application Priority Data

Dec. 21, 1984 [JP] Japan ................... 59-268410

[51] Int. Cl.$^6$ ............. B29C 55/06; B29C 67/20; D01D 5/247; D01F 6/06
[52] U.S. Cl. .................. 264/154; 264/209.5; 264/210.5; 264/210.8; 264/235.6; 264/288.8; 264/290.5
[58] Field of Search ............ 264/41, 154, 209.5, 264/210.1, 210.5, 210.8, 235.6, 288.8, 290.5, DIG. 47

[56] References Cited

U.S. PATENT DOCUMENTS

| | | | |
|---|---|---|---|
| 3,619,460 | 11/1971 | Chill ........................... | 264/288.4 |
| 3,679,538 | 7/1972 | Druin et al. .................. | 264/41 X |
| 3,801,404 | 4/1974 | Druin et al. .................. | 264/235.6 X |
| 3,801,692 | 4/1974 | Zimmerman .................. | 264/154 |
| 3,843,761 | 10/1974 | Bierenbaum et al. .......... | 264/154 |
| 4,055,696 | 10/1977 | Kamada et al. ............... | 264/209.5 X |
| 4,105,737 | 8/1978 | Suzuki .......................... | 264/154 |
| 4,107,361 | 8/1978 | Parker .......................... | 428/17 |
| 4,138,459 | 2/1979 | Brazinsky et al. ............ | 264/154 |
| 4,153,751 | 5/1979 | Schwarz ....................... | 264/154 X |
| 4,405,688 | 9/1983 | Lowery et al. ................ | 428/398 X |
| 4,472,328 | 9/1984 | Sugimoto et al. ............. | 264/41 |
| 4,541,981 | 9/1985 | Lowery et al. ................ | 264/209.1 |
| 4,563,317 | 1/1986 | Kamei et al. .................. | 264/154 X |

FOREIGN PATENT DOCUMENTS

| | | |
|---|---|---|
| 49-39670 | 4/1974 | Japan ................... 264/154 |
| 52-137026 | 11/1977 | Japan . |
| 53-38715 | 4/1978 | Japan . |
| 54-34418 | 3/1979 | Japan . |
| 54-68414 | 6/1979 | Japan . |
| 55-2176 | 1/1980 | Japan . |
| 55-107505 | 8/1980 | Japan . |
| 1180066 | 2/1970 | United Kingdom . |
| 2041821 | 9/1980 | United Kingdom . |

*Primary Examiner*—Leo B. Tentoni
*Attorney, Agent, or Firm*—McAulay Fisher Nissen Goldberg & Kiel

[57] ABSTRACT

A process of producing a porous polypropylene hollow fiber or film which comprises a step for forming a large number of micropores in the surrounding wall of said fiber or in said film by drawing a polypropylene hollow fiber or film, which is characterized in that the drawing process is performed at a temperature in the range of 110°–155° C. and at a drawing rate of less than 10%/min.

6 Claims, No Drawings

PROCESS OF PRODUCING POROUS POLYPROPYLENE HOLLOW FIBER AND FILM

This is a continuation of application Ser. No. 8/067,419, filed May 24, 1993, now abandoned, which, in turn, is a continuation of application Ser. No. 07/893,606, filed Jun. 3, 1992, now abandoned, which, in turn, is a continuation of application Ser. No. 07/711,512, filed Jun. 3, 1991, now abandoned, which, in turn, is a continuation of application Ser. No. 07/433,463, filed Nov. 8, 1989, now abandoned, which, in turn, is a continuation of application Ser. No. 07/207,026, filed Jun. 13, 1988, now abandoned, which, in turn, is a continuation of application Ser. No. 06/811,519, filed Dec. 20, 1985, now abandoned.

BACKGROUND OF THE INVENTION

1. Field of the Invention

The present invention relates to a process of producing a porous polypropylene hollow fiber or film.

2. Description of Prior Arts

A porous hollow fiber made of a polymer material having the surrounding wall with a large number of micropores formed therein is used widely as a device for separating various substances. For examples, in the clinical field, it is employable for separation of blood plasma or as a membrane for artificial lung and ultrafilteration.

As a process of producing a porous hollow fiber or a porous film, there is known a process which comprises steps of preparing a hollow fiber or film made of a polymer material containing a soluble material dispersed therein and then removing said soluble material by dissolving it with an appropriate solvent to form a large number of micropores in the surrounding wall of said fiber or in said film. Recently, an alternative process using a hollow fiber or film of a thermoplastic crystalline polymer material has been proposed and now is used in practice. In this process, the hollow fiber or film is heat-treated and then subjected to a drawing process to form pores in the surrounding wall of the fiber or in the film. Thermoplastic polymers which can be used for the above purpose are polyolefin, polyamide, polyester and other analogous copolymers. Among those materials, polypropylene (homopolymer of propylene or a copolymer of propylene and other monomer) is considered to be satisfactory as the polymer material for producing a porous hollow fiber or film because it is excellent in moldability, mechanical strength and resistance to chemicals.

Porous hollow fibers using polypropylene as the polymer material and processes of producing the same are described in Japanese Patent Provisional Publications No. 52(1977)-15627 No. 52(1977)-137026, No. 53(1978)-38715, 54(1979)-34418, No. 54(1979)-68414, No. 54(1979)-38623, No. 55(1980)-1314, No. 55(1980)-107505 and No. 57(1982)-5914. Most of these processes disclosed in the above publications comprises a procedure in which a polypropylene hollow fiber which has been spun is first heat-treated and then drawn at a temperature in the range of from a glass transition point up to 110° C. (mainly at a temperature in the vicinity of room temperature) to form micropores whereby producing a porous body. The resultant body is again drawn at a temperature of not lower than 110° C. and then further heat-treated so as to have the produced micropores fixed therein.

Porous polypropylene films and processes of producing the same are described, for instance, in Japanese Patent Publications No. 46(1971)-40119, No. 55(1980)-2176 ad No. 55(1980)-32531. Most of these processes disclosed in the above publications comprises a procedure in which a moulded polypropylene film is first heat-treated ad then drawn at a temperature in the vicinity of room temperature or at a temperature of not lower than the second order transition point of the thermoplastic resin employed to form micropores producing a porous body. The resultant body is again drawn at a temperature higher than that of the first drawing process ad then further heat-treated so as to have the produced micropores fixed therein.

In the conventional process for producing the polypropylene hollow fiber, the process comprises two drawing steps consisting of drawing the fiber at a temperature in the vicinity of room temperature and again drawing it at a temperature higher than that of the first drawing (not lower than 110° C.), so that the process is complicated.

Further, in the above conventional process, the step of increasing the crystallinity in a polypropylene hollow fiber is necessarily introduced before the drawing step in order to improve the quality of resulting porous polypropylene hollow fiber. Therefore, the manufacturing process as a whole is very complicated.

Still further, the porous polypropylene hollow fiber obtained in the conventional process is not always satisfactory in the use for separation of blood plasma, etc. which requires a relatively large pore size.

The process of producing a porous polypropylene hollow fiber by drawing at a temperature of not higher than 110° C. (mainly at a temperature in the vicinity of room temperature) can only give porous polypropylene hollow fiber having micropores with relatively small pore sizes and a low porosity, though the process involves simple steps.

In view of the application purpose of a porous polypropylene film, micropores formed in the film are desired to be uniformly distributed at a porosity as desired. However, the porous polypropylene film obtained in the above process has a relatively small average pore size such as not larger than 5,000 angstrom and a low porosity. For these reasons, the porous polypropylene film obtained in the above conventional process is not appropriate in the use as membrane for separation of blood plasma, etc., and the use of the porous film is thus under limitation.

The conventional process of producing a porous polypropylene film generally requires a supplemental procedure for increasing the crystallinity in order to improve the quality of the resulting porous polypropylene film. Therefore, the process of producing a porous polypropylene film comprising such a supplemental procedure tends to be complicated as a whole.

SUMMARY OF THE INVENTION

The present inventors have studied to improve the above-described conventional manufacturing processes and found that a porous polypropylene hollow fiber or film having a high porosity, a large average pore size and uniformly distributed micropores can be obtained when a polypropylene hollow fiber or film is drawn at a temperature in the specific range and at a drawing rate also in the specific range.

There is provided by the present invention a process of producing a porous polypropylene hollow fiber or film which comprises a step for forming a large number of micropores in the surrounding wall of said fiber or in said film by drawing a polypropylene hollow fiber or a polypropylene film, which is characterized in that the drawing process is performed at a temperature in the range of 110°–155° C. and at a drawing rate of less than 10%/min.

DETAILED DESCRIPTION OF THE INVENTION

In the present invention, the conditions required for the formation of pores are entirely different from those required by the conventional processes. Accordingly, there is no specific limitation on the kind of polypropylene to be used, and homopolymers of propylene, block copolymers of propylene with other monomers or oligomers and random copolymers of propylene with other monomers or oligomers can be used (in the specification, the term of polypropylene is used to include all of the above-mentioned copolymers, unless otherwise specified). There is no specific limitation on the monomers and oligomers, as far as these are copolymerizable with propylene. Examples include ethylene and oligomers derived from ethylene.

In addition, polypropylenes containing additives such as a plasticizer, dye, pigment, filler and fireretardant can be also used.

In the present process of producing a porous polypropylene hollow fiber, a polypropylene is first spun according to the conventional procedure of manufacturing a hollow fiber, so as to obtain a hollow fiber (not yet drawn). Appropriate conditions for spinning can be chosen from known conditions. For example, the spinning temperature is above the temperature at which the polypropylene can be melted and below the temperature at which the polypropylene becomes thermally decomposed, while the temperature normally applied to is from 170° C. to 300° C. and preferably from 190° C. to 270° C. There is no specific limitation on the draft ratio (the ratio of the collecting rate of fiber to the extruding rate from the nozzle: collecting rate/extruding rate) which indicates the degree of crystal orientation. However, in the case where the draft ratio is zero or nearly zero (i.e. the case where crystals are not or almost not oriented), it is rather difficult to provide a porous polypropylene hollow fiber having the desired properties, even if the drawing process of the present invention is applied. Therefore, in consideration of the properties of a porous polypropylene hollow fiber produced such as porosity and average diameter of micropores; and also in consideration of workability for manufacturing, the draft ratio of the polypropylene hollow fiber to be employed in the present invention is preferably in the range of 10–6,000.

In the process of producing a porous polypropylene film, a polypropylene resin as described hereinbefore is first formed according to the conventional method of preparing films so as to obtain a polypropylene film (not yet drawn). Examples of the methods of the preparation of a film employable in the invention include a blown film forming method and a T-die film forming method. Appropriate conditions in those methods can be chosen from known conditions. For example, the forming temperature is above the temperature at which the polypropylene can be extruded and below the temperature at which the polypropylene becomes thermally decomposed, while the temperature normally applied to is from 170° C. to 300° C. and preferably from 190° C. to 270° C.

There is no specific limitation on the elastic recovery (or the draft ratio) of a polypropylene film (not yet drawn) obtained by the forming method. However, in the case where the elastic recovery (or the draft ratio) is zero (%) or nearly zero (i.e. the case where crystals are not or almost not oriented), it is rather difficult to provide a porous polypropylene film with the desirable properties, even if the drawing process of the invention is applied. Therefore, the forming conditions of a porous polypropylene film is preferably set in consideration of the properties of a porous polypropylene film produced such as porosity and average diameter of micropores.

As described above, there is no specific limitation on the elastic recovery of the polypropylene film which has not been drawn. However, the elastic recovery is preferably more than 20% (value given in the test after the length as much as 50% at 25° C. and 65%RH). More preferably, the elastic recovery ranges from 30%–95%, from the viewpoint of workability in the use of an ordinary-type extruder.

The elastic recovery (%) is expressed by [(length of stretched film)−(length of film recovered after having been subjected to the stretching)]/[(length of stretched film)−(length of film before being subjected to the stretching)]×100.

In consideration of the above-described requisites, workability, etc., the draft ratio of the polypropylene film to be employed in the present invention (the ratio of the collecting rate of thermoplastic resin film to the extruding rate from the nozzle: collecting rate/extruding rate) is preferably in the range of 10–6,000.

A polypropylene hollow fiber or film may be heat-treated prior to the drawing process. This heat treatment enhances the content of crystal structure in the polypropylene hollow fiber or film, and accordingly, the property of a porous polypropylene hollow fiber or film produced from thus heat-treated fiber or film upon the drawing can be further improved.

The above-described heat treatment is performed, for example, by a process in which a polypropylene hollow fiber or film (not having been subjected to the drawing process) is heated in a hot air heated to a temperature in the range of from 100° C. to 155° C. for not shorter than 3 seconds.

The drawing process of the invention is performed at a temperature in the range of from 110° C. to 155° C., preferably 110° C. to 145° C., and at a drawing rate of less than 10%/min., but preferably not less than 0.000011 %/min., most preferably not less than 0.1%/min.

If the temperature for the drawing is below 110° C., various problems are apt to happen. For example, the micropores are not sufficiently enlarged, or the hollow fiber or the film is apt to be broken when the draw ratio is small so as to give a low porosity.

On the contrary, if the temperature for the drawing exceeds 155° C., various problems are also apt to happen. For example, the diameter of hollow fiber or the width of film becomes small, or the polypropylene employed is melted or partially melted so as to form no pore or to give micropores with small pore size.

If the drawing rate is not less than 10%/min., micropores with sufficiently large pore size are hardly obtained, or sometimes any pore cannot be obtained. In addition, the diameter of hollow fiber or the width of film employed is apt to be small.

As far as the drawing rate is less than 10%/min., the average pore diameter and the porosity increase almost proportionally to the draw ratio.

The draw ratio can be varied according to the average pore diameter depending upon the purpose of the aimed porous polypropylene hollow fiber or film. The draw ratio generally ranges from 100% to 700%, preferably from 150% to 600%, based on the length of the polypropylene hollow fiber or film before being subjected to the drawing. If the draw ratio exceeds 700%, the fiber or film is apt to be broken.

A polypropylene hollow fiber or film may be drawn at a temperature in the vicinity of room temperature and further drawn at an extremely low temperature in the specific medium such as liquid nitrogen so as to produce a porous polypropylene hollow fiber or film owing to the crazing phenomenon of the specific medium. Thus produced porous polypropylene hollow fiber or film can be then subjected to the aforementioned drawing process.

The porous polypropylene hollow fiber or film obtained by the drawing process of the present invention is then preferably subjected to a heat treatment for fixing the micropores formed in the fiber or film. The heat treatment can be performed, for example, by placing the polypropylene hollow fiber or film having the micropores formed therein and being under the drawing conditions, in an air heated at 110° to 155° C. preferably 130° to 155° C., for at least 3 seconds. If the heating temperature exceeds 155° C., the formed micropores may sometimes be closed. If the heating temperature is below 110° C. or if the heating time is shorter than 3 seconds, the micropores may be closed later because of insufficient fixing, or the sizes of the micropores are apt to be readily reduced with temperature variations in the practical use.

Examples of the present invention are given below.

EXAMPLE 1

Polypropylene (UBE-PP-F109K, trade name, available from Ube Industries, Ltd., MFI=9 g/10 min.) was spun using a nozzle made for producing hollow fibers, which was equipped with a gas supplier tube of the diameter of 8 mm and inner diameter of 7 mm under the conditions of the spinning temperature at 210° C., collecting rate of 200 m/min., and draft ratio of 726. The obtained polypropylene hollow fiber was heat-treated for 30 minutes in an air bath heated to 145° C., and then the fiber was drawn to give a length of 120% based on the initial length at a drawing rate of 8.33%/min. Subsequently, the drawn fiber was placed under the tension in the air bath heated at 145° C. for 15 minutes to obtain a porous polypropylene hollow fiber.

The average pore diameter and porosity measured by the mercury injection process (measurements were performed using POROSIMETRO SERIES 1500 produced by CARLOERBA Corp., Italy) were 0.23 μm and 40%, respectively.

EXAMPLE 2

Polypropylene (UBE-PP-Y109K, trade name, available from Ube Industries, Ltd., MFI=1 g/10 min.) was formed in an extruder equipped with a blown film forming die having a diameter of 50 mm and a slit gap of 0.7 mm to give a polypropylene film (not yet drawn). The film forming operation was performed in the following manner. The polypropylene was extruded at 200° C. with blowing an air into the valve at a blow ratio of 0.7, and thus produced film was cooled by the blowing an air at room temperature onto the outer surface of the film at 5 cm on the dice. The cooled film was collected at 1.8 m on the dice by nip rolls at a collecting rate of 35 m/min.

The thickness of the obtained film (not yet drawn) was 20 μm, and showed an elastic recovery of 38% from 50% stretched condition.

The film was drawn at a temperature of 145° C. and a drawing rate of 8.33%/min to give a length of 300% based on the initial length. Subsequently, the drawn film was placed under the tension in the air bath heated at 145° C. for 10 minutes to obtain a porous polypropylene film.

The average pore diameter and porosity of the film measured by the mercury injection process (measurements were performed using the aforementioned POROSIMETRO SERIES 1500) were 0.6 μm and 67%, respectively.

We claim:

1. A process for producing a porous polypropylene hollow fiber or film which comprises the steps of:
    preheating a polypropylene hollow fiber or film to a temperature of 100° to 155° C.;
    drawing the preheated hollow fiber or film at a temperature of 110° to 155° C. at a rate of from 0.1%/min. to less than 10%/min. to reach a draw ratio in the range of 100% to 700% and to form a large number of micropores in the surrounding wall of the fiber or in the film, the draw ratio being based on the length of the fiber or film before being subjected to the drawing; and
    heating the drawn hollow fiber or film at a temperature of 100° to 155° C. to fix the micropores on the wall of the fiber or in the film.

2. The process of claim 1, wherein the step of drawing the preheated hollow fiber or film is performed at a temperature of 110° to 145° C.

3. The process of claim 1, wherein the step of drawing the preheated hollow fiber or film is performed to reach a draw ratio in the range of 150% to 600%.

4. The process of claim 1, wherein the step of heating the drawn hollow fiber or film is performed at a temperature of 130° to 155° C.

5. The process of claim 1, wherein the drawing is carried out in a single step.

6. The process of claim 1, wherein the preheating is carried out for at least 3 seconds.

* * * * *